US012539700B2

(12) United States Patent
Araki et al.

(10) Patent No.: US 12,539,700 B2
(45) Date of Patent: Feb. 3, 2026

(54) HEAD MODULE, IMAGE FORMING APPARATUS, AND LIQUID DISCHARGE APPARATUS

(71) Applicants: Satomi Araki, Kanagawa (JP); Takahiro Yoshida, Kanagawa (JP)

(72) Inventors: Satomi Araki, Kanagawa (JP); Takahiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 140 days.

(21) Appl. No.: 18/520,597

(22) Filed: Nov. 28, 2023

(65) Prior Publication Data

US 2024/0173984 A1 May 30, 2024

(30) Foreign Application Priority Data

Nov. 29, 2022 (JP) ................................ 2022-190310
Sep. 14, 2023 (JP) ................................ 2023-149252

(51) Int. Cl.
*B41J 2/175* (2006.01)
*B41J 2/045* (2006.01)

(52) U.S. Cl.
CPC ............ *B41J 2/175* (2013.01); *B41J 2/04531* (2013.01)

(58) Field of Classification Search
CPC ........ B41J 2/175; B41J 2/04531; B41J 3/407; B41J 2/18; B41J 2/195
USPC ........................................................... 347/85
See application file for complete search history.

(56) References Cited

U.S. PATENT DOCUMENTS

2006/0007272 A1 1/2006 Ogata et al.
2007/0080978 A1 4/2007 Yoshida
2007/0211092 A1 9/2007 Shingyohuchi et al.
2008/0024536 A1 1/2008 Hirano et al.
2008/0117262 A1 5/2008 Mori et al.
2009/0102907 A1 4/2009 Yamanaka et al.
2009/0147034 A1 6/2009 Yoshida
(Continued)

FOREIGN PATENT DOCUMENTS

CN 103223774 A 7/2013
CN 108215492 A 6/2018
(Continued)

OTHER PUBLICATIONS

Extended European Search Report issued May 3, 2024 in European Patent Application No. 23211926.3, 8 pages.
(Continued)

*Primary Examiner* — Shelby L Fidler
*Assistant Examiner* — Tracey M Mcmillion
(74) *Attorney, Agent, or Firm* — XSENSUS LLP

(57) ABSTRACT

A head module includes at least two liquid discharge heads, a reservoir, a heater, an inlet, a first outlet, a second outlet, and a wall member. The liquid discharge heads discharge liquid. The reservoir stores the liquid. The heater heats the liquid in the reservoir. The liquid is to be introduced from the inlet into the reservoir. The liquid in the reservoir is to be delivered from the first outlet to one of the liquid discharge heads. The liquid in the reservoir is to be delivered from the second outlet to another of the liquid discharge heads. A distance between the inlet and the first outlet is shorter than a distance between the inlet and the second outlet. The wall member is interposed between the inlet and the first outlet.

13 Claims, 8 Drawing Sheets

(56) References Cited

U.S. PATENT DOCUMENTS

| | | | |
|---|---|---|---|
| 2009/0289975 | A1 | 11/2009 | Yoshida |
| 2010/0188467 | A1* | 7/2010 | Hyakudome ........ B41J 2/17596 347/85 |
| 2011/0096113 | A1 | 4/2011 | Yoshida |
| 2012/0236080 | A1 | 9/2012 | Yoshida et al. |
| 2014/0210914 | A1 | 7/2014 | Yoshida et al. |
| 2014/0218428 | A1 | 8/2014 | Araki et al. |
| 2014/0232796 | A1 | 8/2014 | Kimura et al. |
| 2014/0285554 | A1 | 9/2014 | Yanaka et al. |
| 2015/0077469 | A1 | 3/2015 | Kohda et al. |
| 2015/0246533 | A1 | 9/2015 | Nemoto et al. |
| 2015/0246536 | A1 | 9/2015 | Yoshida |
| 2015/0251414 | A1 | 9/2015 | Araki |
| 2015/0375504 | A1 | 12/2015 | Kitaoka et al. |
| 2016/0075132 | A1 | 3/2016 | Kitaoka et al. |
| 2016/0082728 | A1 | 3/2016 | Kohda et al. |
| 2016/0096369 | A1 | 4/2016 | Shimizu et al. |
| 2016/0129691 | A1 | 5/2016 | Yoshida |
| 2016/0185113 | A1 | 6/2016 | Yoshida et al. |
| 2016/0297193 | A1 | 10/2016 | Yoshida |
| 2017/0066236 | A1 | 3/2017 | Sohgawa et al. |
| 2017/0087865 | A1 | 3/2017 | Yoshida et al. |
| 2017/0096015 | A1 | 4/2017 | Odaka et al. |
| 2017/0120602 | A1 | 5/2017 | Nakai et al. |
| 2017/0157924 | A1 | 6/2017 | Otome et al. |
| 2017/0239949 | A1 | 8/2017 | Yoshida |
| 2017/0253062 | A1 | 9/2017 | Murakami et al. |
| 2017/0297333 | A1 | 10/2017 | Kohda et al. |
| 2018/0105711 | A1 | 4/2018 | Katoh et al. |
| 2018/0126731 | A1 | 5/2018 | Ishikawa et al. |
| 2018/0154657 | A1 | 6/2018 | Iio et al. |
| 2018/0178538 | A1 | 6/2018 | Miyazawa et al. |
| 2018/0194135 | A1 | 7/2018 | Iwama et al. |
| 2018/0257374 | A1 | 9/2018 | Yoshida et al. |
| 2018/0272709 | A1 | 9/2018 | Iwata et al. |
| 2018/0272730 | A1 | 9/2018 | Odaka et al. |
| 2018/0272739 | A1 | 9/2018 | Sawase et al. |
| 2018/0272740 | A1 | 9/2018 | Otome et al. |
| 2018/0272743 | A1 | 9/2018 | Nakai et al. |
| 2019/0084313 | A1 | 3/2019 | Kohda et al. |
| 2019/0240978 | A1 | 8/2019 | Kawahara et al. |
| 2019/0263119 | A1 | 8/2019 | Odaka et al. |
| 2019/0283414 | A1 | 9/2019 | Yoshida |
| 2020/0086652 | A1 | 3/2020 | Iio et al. |
| 2020/0094573 | A1 | 3/2020 | Kohda et al. |
| 2020/0147961 | A1 | 5/2020 | Yoshida |
| 2020/0164644 | A1 | 5/2020 | Yoneta et al. |
| 2020/0238696 | A1 | 7/2020 | Yoshida |
| 2020/0282740 | A1 | 9/2020 | Kohda et al. |
| 2020/0331262 | A1 | 10/2020 | Andou et al. |
| 2020/0346457 | A1 | 11/2020 | Iwata et al. |
| 2021/0001629 | A1 | 1/2021 | Yoshida |
| 2021/0023838 | A1 | 1/2021 | Saito et al. |
| 2021/0031508 | A1* | 2/2021 | Kachi .................. B41J 2/14201 |
| 2021/0063067 | A1* | 3/2021 | Sugimura ............... F25B 39/00 |
| 2021/0162746 | A1 | 6/2021 | Araki |
| 2021/0178776 | A1 | 6/2021 | Kohda et al. |
| 2021/0229455 | A1 | 7/2021 | Yoneta |
| 2022/0032621 | A1 | 2/2022 | Yoshida et al. |
| 2022/0169020 | A1 | 6/2022 | Yoshida |
| 2022/0250392 | A1 | 8/2022 | Kohda et al. |
| 2023/0079595 | A1 | 3/2023 | Araki |
| 2023/0098478 | A1 | 3/2023 | Yoshida |
| 2023/0249455 | A1 | 8/2023 | Yoshida et al. |
| 2023/0302798 | A1 | 9/2023 | Araki et al. |
| 2023/0302800 | A1 | 9/2023 | Yumoto et al. |
| 2023/0302801 | A1 | 9/2023 | Yoshida |

FOREIGN PATENT DOCUMENTS

| | | | |
|---|---|---|---|
| JP | 2006-035588 | A | 2/2006 |
| JP | 2010-214655 | A | 9/2010 |
| JP | 2011-201231 | A | 10/2011 |
| JP | 2012-011669 | A | 1/2012 |
| JP | 2017-190940 | A | 10/2017 |
| JP | 2020-179534 | A | 11/2020 |
| JP | 2021-115772 | A | 8/2021 |

OTHER PUBLICATIONS

Office Action issued Nov. 15, 2025 in Chinese Patent Application No. 202311458828.7, 7 pages.

* cited by examiner

HEAD MODULE, IMAGE FORMING APPARATUS, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-190310, filed on Nov. 29, 2022, and No. 2023-149252, filed on Sep. 14, 2023, in the Japan Patent Office, the entire disclosure of each of which is hereby incorporated by reference herein.

BACKGROUND

Technical Field

Embodiments of the present disclosure relate to a head module, an image forming apparatus, and a liquid discharge apparatus.

Related Art

An inkjet image forming apparatus that discharges liquid ink onto a sheet, such as a paper sheet, to form an image is known as an example of a liquid discharge apparatus that discharges liquid.

Some of such inkjet image forming apparatuses are configured such that in order to supply liquid at an appropriate temperature from a reservoir in which the liquid is stored to a liquid discharge head, the liquid in the reservoir is heated by a heating member such as a heater.

For example, in a case where liquid is distributed and supplied from a single reservoir to a plurality of liquid discharge heads, the temperature of liquid to be supplied varies between the liquid discharge heads if there is a difference between distances (lengths of liquid flow paths) from an inlet from which the liquid is introduced into the reservoir to outlets from which the liquid in the reservoir is delivered to the liquid discharge heads. That is, when the distance from the inlet to the outlet is longer, the liquid is heated in the reservoir for a longer time. Thus, the temperature of the liquid to be supplied to the liquid discharge head tends to increase. In contrast, when the distance from the inlet to the outlet is shorter, the liquid is heated in the reservoir for a shorter time. Thus, the temperature of the liquid to be supplied to the liquid discharge head tends to decrease. As described above, if the temperature of liquid to be supplied varies between liquid discharge heads, the viscosity of liquid to be discharged also varies between the liquid discharge heads. This may cause unevenness in the thickness of the liquid, a shift in a position where the liquid is to be applied, and the like.

SUMMARY

According to an embodiment of the present disclosure, a head module includes at least two liquid discharge heads, a reservoir, a heater, an inlet, a first outlet, a second outlet, and a wall member. The liquid discharge heads discharge liquid. The reservoir stores the liquid. The heater heats the liquid in the reservoir. The liquid is to be introduced from the inlet into the reservoir. The liquid in the reservoir is to be delivered from the first outlet to one of the liquid discharge heads. The liquid in the reservoir is to be delivered from the second outlet to another of the liquid discharge heads. A distance between the inlet and the first outlet is shorter than a distance between the inlet and the second outlet. The wall member is interposed between the inlet and the first outlet.

According to another embodiment of the present disclosure, an image forming apparatus includes the head module.

According to still another embodiment of the present disclosure, a liquid discharge apparatus includes the head module.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
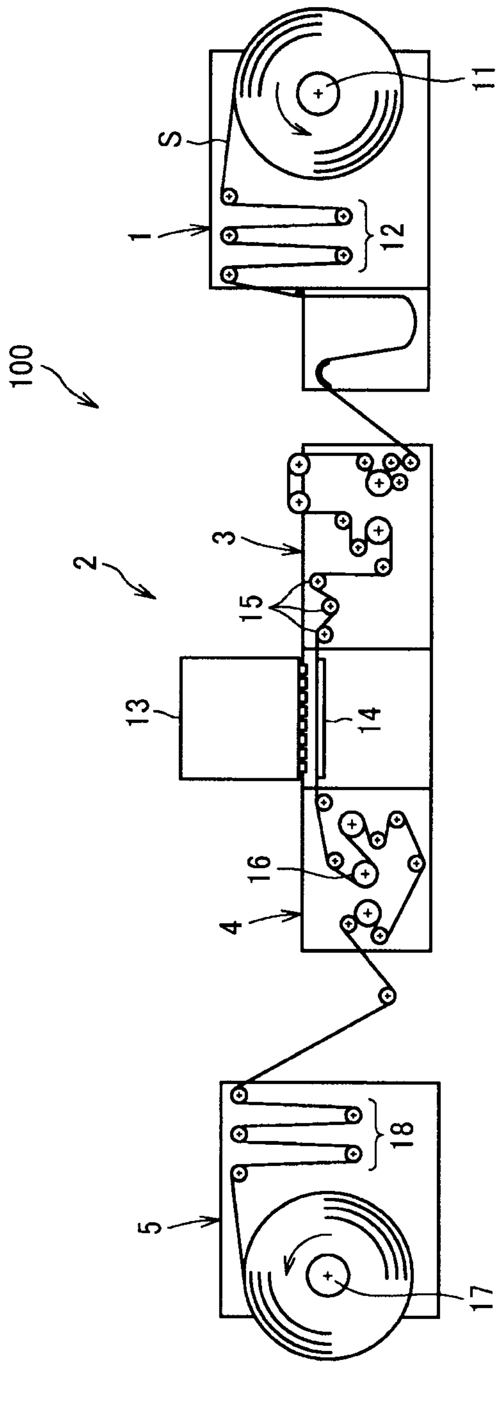
FIG. 1 is a diagram illustrating a general arrangement of an inkjet image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure will be described with reference to the accompanying drawings. In the drawings for describing embodiments of the present disclosure, constituent elements such as members and component parts having identical functions or shapes are given the same reference numerals as long as the constituent elements are distinguishable, and redundant descriptions are omitted.

Figure 2:
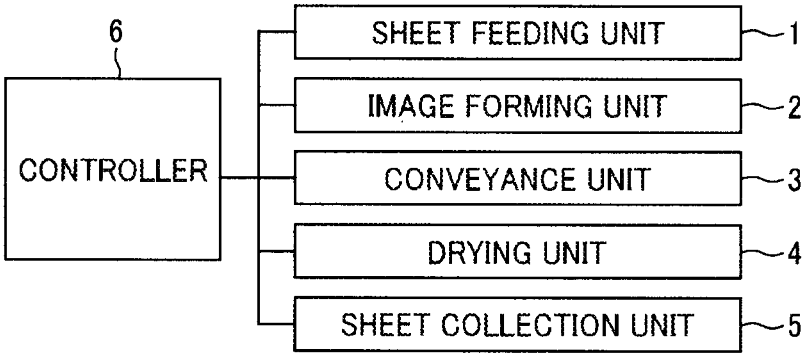
FIG. 2 is a diagram illustrating a control system of the inkjet image forming apparatus of FIG. 1.

First, a configuration of an inkjet image forming apparatus which is a liquid discharge apparatus according to an embodiment of the present disclosure will be described with reference to FIGS. 1 and 2. FIG. 1 is a diagram illustrating a general arrangement of the inkjet image forming apparatus, and FIG. 2 is a diagram illustrating a control system of the inkjet image forming apparatus.

As illustrated in FIG. 1, an image forming apparatus 100 according to the present embodiment includes a sheet feeding unit 1, an image forming unit 2, a conveyance unit 3, a drying unit 4, and a sheet collection unit 5. The sheet feeding unit 1 feeds a sheet S for image formation. The image forming unit 2 forms an image on the sheet S. The conveyance unit 3 conveys the sheet S to the image forming unit 2. The drying unit 4 dries the sheet S. The sheet collection unit 5 collects the sheet S on which the image has been formed. In addition, the image forming apparatus 100 according to the present embodiment includes a controller 6 (see FIG. 2) that controls the sheet feeding unit 1, the image forming unit 2, the conveyance unit 3, the drying unit 4, and the sheet collection unit 5.

The sheet feeding unit 1 includes a feed roller 11 and a tension adjustment mechanism 12. The sheet S, which is a long sheet roll, is wound around the feed roller 11. The tension adjustment mechanism 12 adjusts tension to be applied to the sheet S. The feed roller 11 can rotate in a direction indicated by an arrow illustrated in FIG. 1. The sheet S is fed as the feed roller 11 rotates. The tension adjustment mechanism 12 includes a plurality of rollers that applies tension to the sheet S stretched over the plurality of rollers. Some of the plurality of rollers move to adjust the tension of the sheet S. Thus, the sheet S is fed from the feed roller 11 at a constant tension.

The image forming unit 2 includes a head unit 13 and a platen 14. The head unit 13 is a liquid discharge unit that discharges liquid ink onto the sheet S. The platen 14 serves as a sheet supporting member that supports the sheet S being conveyed. The head unit 13 includes a plurality of liquid discharge heads. An image is formed on the sheet S by ink discharged from each liquid discharge head onto the sheet S based on image data generated by the controller 6. Here, the ink is liquid containing a coloring material, a solvent, and crystalline resin particles dispersed in the solvent. The crystalline resin is resin that is in a crystalline state and undergoes a phase change to melt into liquid when heated to a predetermined melting point or higher. The platen 14 is disposed in such a way as to face the head unit 13, and supports a lower surface of the sheet S fed from the sheet feeding unit 1. The platen 14 can move toward or away from the head unit 13 so that the distance between the head unit 13 and the sheet S can be kept constant.

The conveyance unit 3 includes a plurality of conveyance rollers 15. The sheet S is conveyed to the image forming unit 2 as each of the conveyance rollers 15 rotates in a state where the sheet S is stretched over each of the conveyance rollers 15. Note that the conveyance unit 3 may include another conveyance means such as a conveyance belt.

The drying unit 4 includes a heating drum 16 that heats the sheet S so as to accelerate the drying of ink on the sheet S. The heating drum 16 is a cylindrical member that rotates in a state where the sheet S is wound around an outer circumferential surface of the heating drum 16. The heating drum 16 includes a heating source, such as a halogen heater, disposed therein. In addition to a contact type heating means such as the heating drum 16, a non-contact type heating means such as a hot air generator that blows hot air on the sheet S can also be used as the heating means that heats the sheet S.

The sheet collection unit 5 includes a collection roller 17 and a tension adjustment mechanism 18. The collection roller 17 winds and collects the sheet S. The tension adjustment mechanism 18 adjusts tension to be applied to the sheet S. The collection roller 17 can rotate in a direction indicated by an arrow illustrated in FIG. 1. As the collection roller 17 rotates, the sheet S is collected as a sheet roll wound around the collection roller 17. The tension adjustment mechanism 18 includes a plurality of rollers, as with the tension adjustment mechanism 12 of the sheet feeding unit 1. Some of the plurality of rollers move to adjust the tension of the sheet S. Thus, the sheet S is wound by the collection roller 17 at a constant tension.

The controller 6 includes an information processor such as a personal computer (PC). The controller 6 generates image data on an image to be formed on the sheet S. In addition, the controller 6 controls various types of operation of the sheet feeding unit 1, the image forming unit 2, the conveyance unit 3, the drying unit 4, and the sheet collection unit 5. For example, the controller 6 controls the temperature of the heating source that heats the heating drum 16, in addition to the speeds of rotation of the feed roller 11, the collection roller 17, and each conveyance roller 15.

Figure 3:
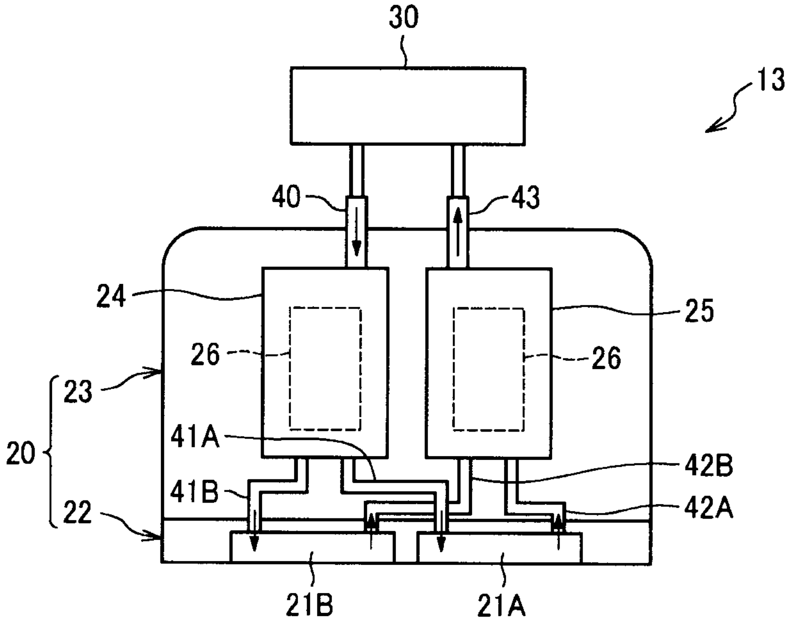
FIG. 3 is a schematic diagram of a configuration of a head unit according to an embodiment of the present disclosure.

FIG. 3 is a schematic configuration diagram of the head unit 13 according to the present embodiment.

As illustrated in FIG. 3, the head unit 13 includes a head module 20 and a liquid circulation device 30. The head module 20 has a function of discharging liquid. The liquid circulation device 30 causes liquid to circulate in the head module 20.

The head module 20 includes a submodule 22 and a manifold 23. The submodule 22 includes two liquid discharge heads 21A and 21B. The manifold 23 distributes and supplies liquid to the liquid discharge heads 21A and 21B. The number of the liquid discharge heads 21 to be included in the submodule 22 may be three or more.

Each of the liquid discharge heads 21A and 21B includes a plurality of nozzles for discharging liquid. The plurality of nozzles is arranged in a direction orthogonal to a sheet conveyance direction to form a nozzle array. For example, such nozzle arrays are arranged in two rows in the sheet conveyance direction.

The manifold 23 includes two tanks 24 and 25 as reservoirs in which liquid is stored. One of the two tanks 24 and 25, that is, the tank 24 is a supply tank in which liquid to be supplied to each of the liquid discharge heads 21A and 21B is stored. The other tank, that is, the tank 25 is a recovery tank in which liquid recovered from each of the liquid discharge heads 21A and 21B is stored.

The supply tank 24 has a single common supply passage 40 and two individual supply passages 41A and 41B. Liquid supplied from the liquid circulation device 30 is introduced into the supply tank 24 through the common supply passage 40. Liquid is supplied from the supply tank 24 to the liquid discharge heads 21A and 21B through the individual supply passages 41A and 41B, respectively. Meanwhile, the recovery tank 25 has two individual recovery passages 42A and 42B and a common recovery passage 43. Liquid is recovered from the liquid discharge heads 21A and 21B and sent to the recovery tank 25 through the individual recovery passages 42A and 42B, respectively. Liquid is sent from the recovery tank 25 to the liquid circulation device 30 through the common recovery passage 43.

A heater 26 is provided as a heating member on each of the supply tank 24 and the recovery tank 25. Liquid in the tanks 24 and 25 are heated by the respective heaters 26. The heaters 26 are provided in such a way as to be in contact with outer surfaces of the supply tank 24 and the recovery tank 25, and heat the liquid stored inside, via the tanks 24 and 25.

The liquid circulation device 30 includes, for example, a compressor and a vacuum pump. The compressor serves as a positive pressure generation means. The vacuum pump serves as a negative pressure generation means. When liquid is circulated to each of the liquid discharge heads 21A and 21B, the inside of the supply tank 24 is pressurized by the compressor, and the inside of the recovery tank 25 is depressurized by the vacuum pump to produce an internal pressure difference between the tanks 24 and 25. As a result, liquid is supplied from the liquid circulation device 30 to the liquid discharge heads 21A and 21B via the supply tank 24, and liquid is recovered from the liquid discharge heads 21A and 21B and sent to the liquid circulation device 30 via the recovery tank 25. Thus, the liquid circulates.

Here, a configuration of a comparative example different from the above-described embodiment will be described with reference to FIG. 13.

Figure 13:
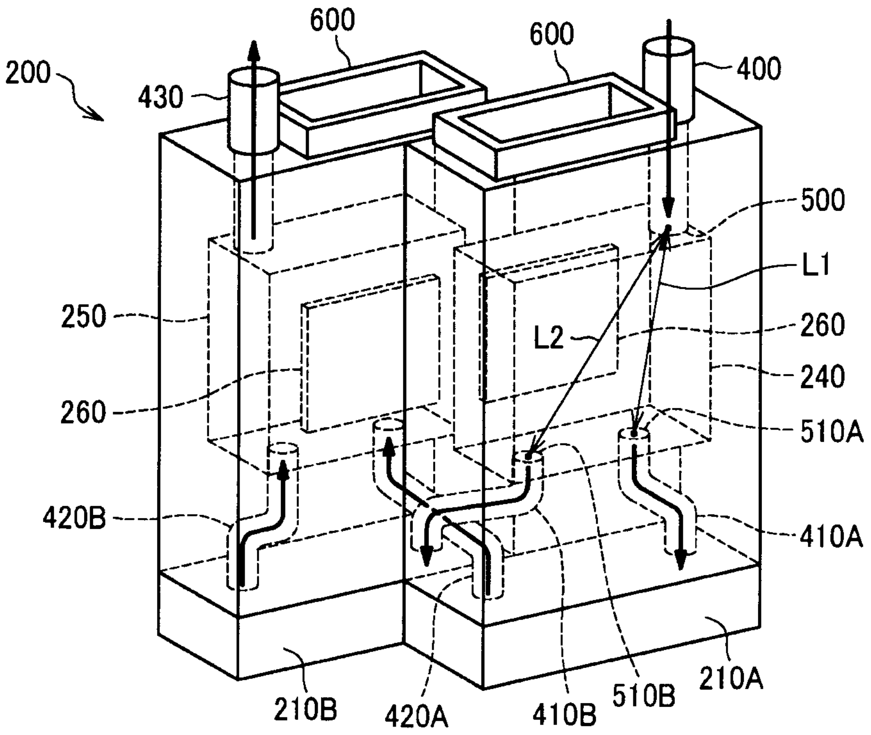
FIG. 13 is a diagram illustrating a configuration of a head module according to a comparative example of the present disclosure.

As in the above-described embodiment of the present disclosure, a head module 200 of the comparative example illustrated in FIG. 13 includes two liquid discharge heads 210A and 210B, a supply tank 240, a recovery tank 250, and heaters 260. Liquid to be supplied to each of the liquid discharge heads 210A and 210B is stored in the supply tank 240. Liquid recovered from each of the liquid discharge heads 210A and 210B is stored in the recovery tank 250. The heaters 260 heat liquid in the tanks 240 and 250. In addition, the supply tank 240 has a single common supply passage 400 and two individual supply passages 410A and 410B. The common supply passage 400 is coupled to a liquid circulation device. The individual supply passages 410A and 410B are coupled to the liquid discharge heads 210A and 210B, respectively. Meanwhile, the recovery tank 250 has two individual recovery passages 420A and 420B and a single common recovery passage 430. The individual recovery passages 420A and 420B are coupled to the liquid discharge heads 210A and 210B, respectively. The common recovery passage 430 is coupled to the liquid circulation device.

In the head module 200 according to the comparative example, liquid introduced into the supply tank 240 is heated by the heater 260, and is supplied to the liquid discharge heads 210A and 210B through the individual supply passages 410A and 410B, respectively. At this time, the temperature of liquid to be supplied to each of the liquid discharge heads 210A and 210B depends on the time from when the liquid is supplied into the supply tank 240 to when the liquid is discharged from the supply tank 240. That is, when the time from the introduction of the liquid into the supply tank 240 to the discharge of the liquid is longer, the liquid is heated by the heater 260 for a longer time. Thus, the temperature of the liquid becomes higher.

Regarding such a point, in the comparative example, a distance L1 from an inlet 500 of the supply tank 240, which is a point of connection between the supply tank 240 and the common supply passage 400, to an outlet 510A of the supply tank 240, which is a point of connection between the supply tank 240 and the individual supply passage 410A is different from a distance L2 from the inlet 500 of the supply tank 240 to an outlet 510B of the supply tank 240, which is a point of connection between the supply tank 240 and the individual supply passage 410B. Therefore, heating time differs between liquid to be supplied through one of the individual supply passages, that is, the individual supply passage 410A and liquid to be supplied through the other individual supply passage, that is, the individual supply passage 410B. Thus, variation in temperature occurs. In the example illustrated in FIG. 13, the outlet 510A on the right side is disposed immediately below the inlet 500 or in the vicinity thereof, while the outlet 510B on the left side is disposed away from a position immediately below the inlet 500. As a result, the distance L2 between the outlet 510B on the left side and the inlet 500 is longer than the distance L1 between the outlet 510A on the right side and the inlet 500. Therefore, the temperature of the liquid to be supplied through the outlet 510B on the left side tends to be higher than the temperature of the liquid to be supplied through the outlet 510A on the right side.

In the comparative example, there is a difference between the lengths of paths for liquid from the inlet 500 to the outlets 510A and 510B, as described above. This is disadvantageous in that the temperature of liquid to be supplied varies between the liquid discharge heads 210A and 210B. Furthermore, when the temperature of liquid to be supplied varies between the liquid discharge heads 210A and 210B, the viscosity of liquid to be discharged also varies. As a result, there is a possibility that a failure such as a shift in a position where the liquid is to be applied may occur in addition to unevenness in the thickness of the liquid.

If the common supply passage 400 is coupled to, for example, an upper center of the supply tank 240 in the example illustrated in FIG. 13 so as to address the disadvantage described above, the distances from the inlet 500 to the outlets 510A and 510B become equal. This makes it possible to prevent the temperature of liquid to be supplied from varying between the liquid discharge heads 210A and 210B. However, if the common supply passage 400 is coupled to the upper center of the supply tank 240, parts such as a connector 600 (see FIG. 13) cannot be disposed above the supply tank 240. Thus, it is necessary to change the layout of parts.

Alternatively, there is also a method in which the outlets of the supply tank 240 is integrated into one such that supply passages to the liquid discharge heads 210A and 210B branch off at the single outlet. However, in this case, fluctuation in liquid pressure caused when liquid is discharged from one of the liquid discharge heads, that is, the liquid discharge head 210A is likely to propagate to liquid in the other liquid discharge head, that is, the liquid discharge head 210B through the branched supply passages. Thus, there is a possibility that liquid discharge operation in the liquid discharge head 210B may be adversely affected.

Therefore, in view of the above circumstances, the following configurations are adopted in embodiments of the present disclosure to be described below so that it is possible to prevent variation in the temperature of liquid to be supplied between the liquid discharge heads while avoiding a change in the layout of parts such as connectors and propagation of the liquid pressure fluctuation from one to the other of the liquid discharge heads. Hereinafter, configurations of head modules according to embodiments of the present disclosure will be described.

Figure 4:
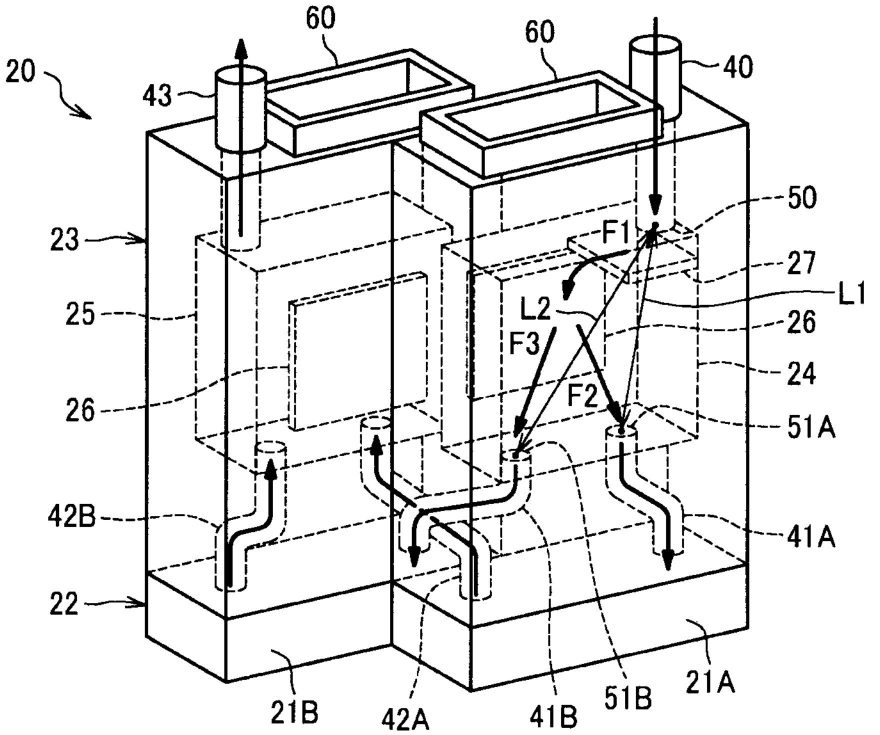
FIG. 4 is a diagram illustrating a configuration of a head module according to a first embodiment of the present disclosure.

FIG. 4 is a diagram illustrating a configuration of a head module according to an embodiment of the present disclosure.

As illustrated in FIG. 4, a wall member 27 is provided in a supply tank 24 in a head module 20 according to the present embodiment. The wall member 27 changes the direction of liquid flow. The wall member 27 is formed of a plate-like member into which liquid does not permeate. When liquid is introduced into the supply tank 24 from a common supply passage 40, movement of the liquid is restricted by the wall member 27 to change the direction of the flow of the liquid. Specifically, in the present embodiment, the movement of the introduced liquid is restricted by the wall member 27. As a result, the liquid moves not in a direction from the common supply passage 40 toward a position immediately below the common supply passage 40 (liquid introduction direction) but in a direction (direction indicated by arrow F1 in the drawing) intersecting the direction from the common supply passage 40 toward the position immediately below the common supply passage 40 (liquid introduction direction).

Here, in the present embodiment, a distance L1 from an inlet 50 of the supply tank 24, which is a point of connection between the supply tank 24 and the common supply passage 40, to an outlet 51A of the supply tank 24, which is a point of connection between the supply tank 24 and an individual supply passage 41A is different from a distance L2 from the inlet 50 of the supply tank 24 to an outlet 51B of the supply tank 24, which is a point of connection between the supply tank 24 and an individual supply passage 41B, as in the above-described comparative example. Here, the distances L1 and L2 refer to distances from the inlet 50 to the outlets 51A and 51B, respectively, in a state where the wall member 27 is not provided. Specifically, in the head module 20 according to the present embodiment, the outlet 51A, that is, a first outlet 51A on the right side in the drawing is disposed immediately below the inlet 50 or in the vicinity thereof, while the outlet 51B, that is, a second outlet 51B on the left side in the drawing is disposed away from a position immediately below the inlet 50. As a result, the distance L2 between the second outlet 51B and the inlet 50 is longer than the distance L1 between the first outlet 51A and the inlet 50, as in the above-described comparative example.

As described above, in the present embodiment, there is a difference between the distances from the inlet 50 to the outlets 51A and 51B. However, the above-described wall member 27 that changes the direction of the flow of liquid is interposed between the inlet 50 and the first outlet 51A at a shorter distance to the inlet 50. Therefore, the liquid does not move linearly from the inlet 50 toward the first outlet 51A, but moves by bypassing the wall member 27 as indicated by arrow F1 in the drawing. That is, since the wall member 27 is provided, the moving distance of the liquid from the inlet 50 to the first outlet 51A becomes longer. Thus, it is possible to reduce the difference between lengths of paths of the liquid from the inlet 50 to the outlets 51A and 51B (the length of a path passing through F1 and F2 and the length of a path passing through F1 and F3).

As a result, a temperature difference is less likely to occur between liquid to be delivered from the first outlet 51A to one of the liquid discharge heads, that is, a liquid discharge head 21A and liquid to be delivered from the second outlet 51B to the other liquid discharge head, that is, a liquid discharge head 21B. Thus, it is possible to prevent failures such as unevenness in the thickness of the liquid to be discharged from each of the liquid discharge heads 21A and 21B and a shift in a position where the liquid is to be applied. Note that paths of liquid indicated by arrows F1, F2, and F3 in the drawing mainly indicate examples of paths through which liquid passes, and not the entire liquid necessarily moves through these paths. This also applies to the drawings other than FIG. 4.

Furthermore, according to the embodiment of the present disclosure, it is possible to prevent variation in liquid temperature just by disposing the wall member 27 in the supply tank 24. Thus, there is no need to change the layout of parts such as connectors. That is, according to the embodiment of the present disclosure, it is not necessary to dispose the common supply passage 40 (inlet 50) at the upper center of the supply tank 24. Thus, the common supply passage 40 (inlet 50) can be disposed at a corner located away from the upper center of the supply tank 24, as illustrated in FIG. 4. Therefore, a connector 60 for sending electric signals to the liquid discharge heads can be disposed at a center position above the supply tank 24. The term "center of the supply tank 24" refers to the center of the supply tank 24 viewed from the liquid introduction direction (upper side in FIG. 4). The same applies to the term "center of the supply tank 24" in the following description.

The wall member 27 is present between the inlet 50 and the first outlet 51A. Preferably, the wall member 27 is disposed in a region not exceeding the center of the supply tank 24 as viewed from the inlet 50. The wall member 27 is disposed in the region not exceeding the center of the supply tank 24 as viewed from the inlet 50, and thus the difference in length between the path of liquid from the inlet 50 to the outlet 51A and the path of liquid from the inlet 50 to the outlet 51B can be reliably reduced.

Furthermore, according to the embodiment of the present disclosure, it is not necessary to integrate the outlets of the supply tank 24 into one such that supply passages branch off at the single outlet. Therefore, it is possible to prevent propagation of liquid pressure fluctuation from one to the other of the liquid discharge heads 21A and 21B. That is, according to the embodiment of the present disclosure, the supply tank 24 has the two outlets 51A and 51B. Thus, liquid can be supplied from the outlets 51A and 51B to the liquid discharge heads 21A and 21B through the individual supply passages 41A and 41B, respectively, as illustrated in FIG. 4. Therefore, even if liquid pressure fluctuates when liquid is discharged from one of the liquid discharge heads, that is, the liquid discharge head 21A, the fluctuation is absorbed by liquid in the supply tank 24. Thus, the fluctuation in the liquid pressure is prevented from propagating to liquid in the other liquid discharge head, that is, the liquid discharge head 21B. This makes it possible to maintain stable liquid discharge operation.

Furthermore, in the embodiment illustrated in FIG. 4, the wall member 27 is disposed above a heater 26 (disposed on the inlet 50 side). It is thus possible to guide liquid to a heating area by changing the direction of liquid flow by means of the wall member 27 before the liquid reaches the heating area for heating by the heater 26. In particular, in the present embodiment, the liquid reaches the heating area after being guided to the center of the supply tank 24 by the wall member 27. Therefore, it is possible to equalize the heating time during which the liquid is heated until reaching the outlets 51A and 51B on both lower end sides of the supply tank 24. As a result, it is possible to more effectively prevent the temperature of liquid to be supplied from varying between the liquid discharge heads 21A and 21B.

Next, a description will be given of another embodiment different from the above embodiment (first embodiment). Differences from the above-described embodiment are mainly described, and descriptions of the same portions are appropriately omitted.

Figure 5:
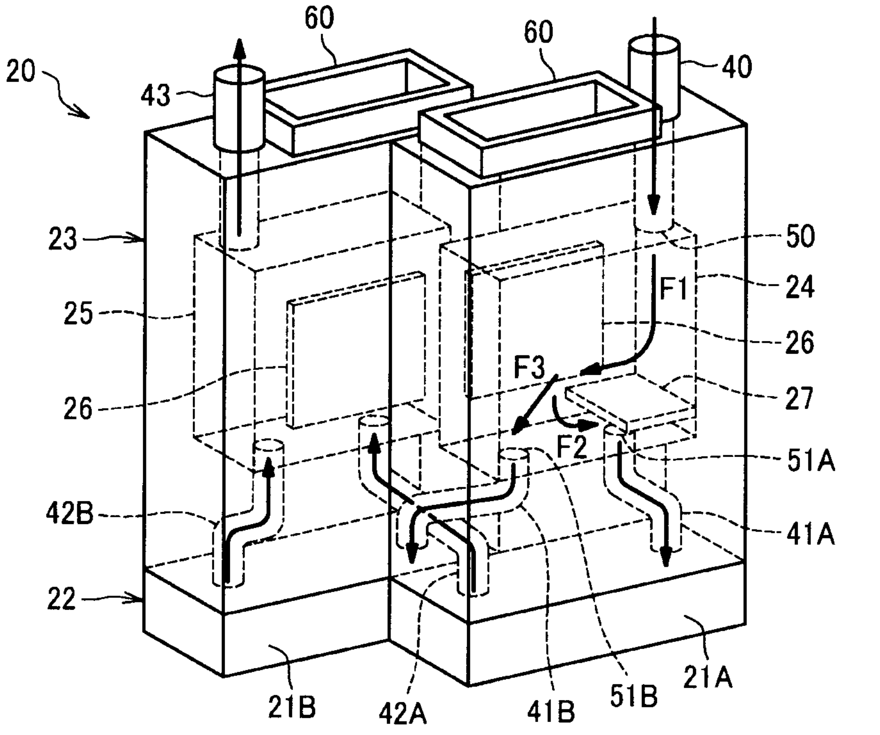
FIG. 5 is a diagram illustrating a configuration of a head module according to a second embodiment of the present disclosure.

FIG. 5 is a diagram illustrating a configuration of a head module 20 according to a second embodiment of the present disclosure.

The position of a wall member 27 of the second embodiment illustrated in FIG. 5 is different from the position of the wall member 27 of the first embodiment (FIG. 4) described above. Except for this point, the second embodiment and the first embodiment have basically the same configuration. Specifically, in the second embodiment, the wall member 27 is disposed not above a heater 26 (on an inlet 50 side) but below the heater 26 (on a first outlet 51A side). In this case, liquid to be sent from the inlet 50 to the first outlet 51A moves, for example, through a path indicated by arrows F1 and F2 in the drawing. Meanwhile, liquid to be sent from the inlet 50 to a second outlet 51B moves, for example, through a path indicated by arrows F1 and F3 in the drawing.

Also in the present embodiment, since the wall member 27 is disposed between the inlet 50 and the first outlet 51A, the linear movement of the liquid from the inlet 50 to the first outlet 51A is restricted by the wall member 27. Thus, the liquid moves by bypassing the wall member 27. As a result, also in the present embodiment, the moving distance of the liquid from the inlet 50 to the first outlet 51A becomes longer. Thus, it is possible to reduce the difference between lengths of paths of the liquid from the inlet 50 to the outlets 51A and 51B (the length of a path passing through F1 and F2 and the length of a path passing through F1 and F3). Therefore, it is possible to prevent the temperature of liquid to be supplied from varying between liquid discharge heads 21A and 21B. Also in the present embodiment, it is possible to avoid a change in the layout of parts such as connectors and propagation of liquid pressure fluctuation from one to the other of the liquid discharge heads. It is thus possible to provide a head module with a high liquid discharge accuracy without a significant design change.

The wall member 27 may be located above the heater 26, as described above. Alternatively, the wall member 27 may be located below the heater 26. Furthermore, the wall member 27 may be provided at a position where the heater 26 is disposed. Note that the wall member 27 is disposed at predetermined distances from the inlet 50 and the first outlet 51A so as not to hinder introduction of liquid from the inlet 50 and outflow of the liquid from the first outlet 51A.

Figure 6:
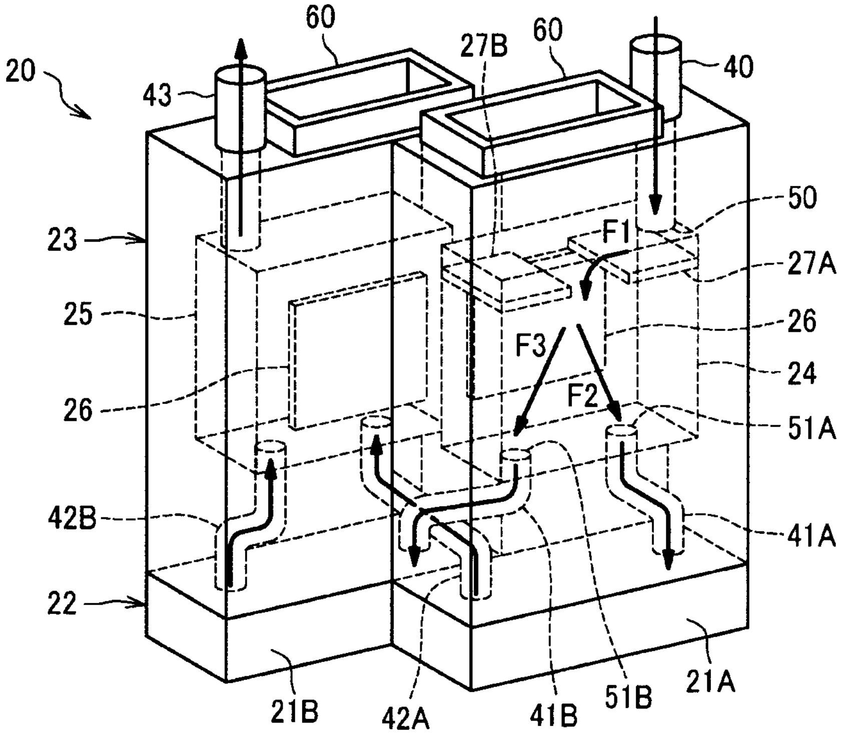
FIG. 6 is a diagram illustrating a configuration of a head module according to a third embodiment of the present disclosure.

FIG. 6 is a diagram illustrating a configuration of a head module 20 according to a third embodiment of the present disclosure.

In the third embodiment illustrated in FIG. 6, two wall members 27A and 27B are provided in a supply tank 24. Except for this point, the third embodiment and the first embodiment (FIG. 4) described above have basically the same configuration. A first wall member 27A, which is one of the two wall members 27A and 27B, is disposed between an inlet 50 and a first outlet 51A, as with the wall member 27 in the first embodiment described above. In contrast, a second wall member 27B, which is the other wall member different from the first wall member 27A, is located away from the first wall member 27A such that the first wall member 27A and the second wall member 27B are disposed on opposite sides of the center of the supply tank 24.

In this case, liquid introduced from the inlet 50 is guided to a heating area for heating by a heater 26 through between the first wall member 27A and the second wall member 27B. In particular, in the present embodiment, the first wall member 27A and the second wall member 27B are disposed on the same plane (on the same level) above the heater 26 (on the inlet 50 side) and symmetric with respect to the center of the supply tank 24. Therefore, liquid is guided to a center position in the heating area through between the wall members 27A and 27B as indicated by arrow F1 in FIG. 6. Then, the liquid separately moves to the outlets 51A and 51B through paths indicated by arrows F2 and F3, respectively. As a result, heating time to heat the liquid moving from the inlet 50 to the outlets 51A and 51B can be made substantially equal. It is thus possible to more reliably prevent the temperature of liquid to be supplied from varying between liquid discharge heads 21A and 21B. Note that the two wall members 27A and 27B need not be disposed on the same plane (on the same level), and may be disposed on slightly different levels. Also in the present embodiment, it is possible to avoid a change in the layout of parts such as connectors and propagation of liquid pressure fluctuation from one to the other of the liquid discharge heads. It is thus possible to provide a head module with a high liquid discharge accuracy without a significant design change.

Figure 7:
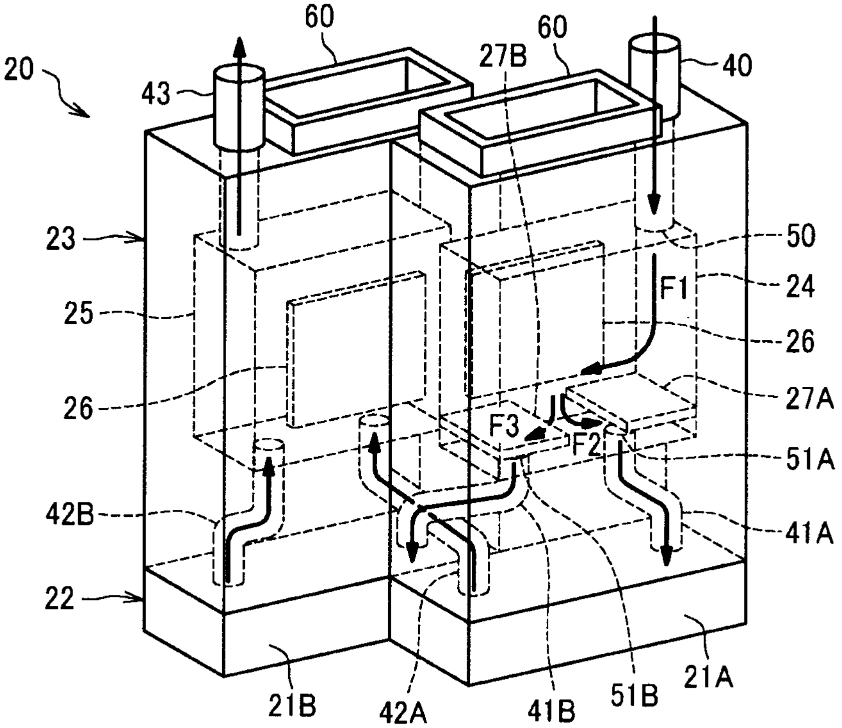
FIG. 7 is a diagram illustrating a configuration of a head module according to a fourth embodiment of the present disclosure.

FIG. 7 is a diagram illustrating a configuration of a head module 20 according to a fourth embodiment of the present disclosure.

In the fourth embodiment illustrated in FIG. 7, two wall members 27A and 27B are disposed below a heater 26 (on a first outlet 51A side). In addition, the two wall members 27A and 27B are disposed on opposite sides of the center of a tank 24. That is, the present embodiment is different from the third embodiment (FIG. 6) described above in that the two wall members 27A and 27B are disposed below the heater 26 (on the first outlet 51A side). Except for this point, the fourth embodiment and the third embodiment have basically the same configuration.

In this case, liquid introduced from an inlet 50 passes through a heating area for heating by the heater 26 as indicated by arrow F1 in FIG. 7, and then moves from between the two wall members 27A and 27B to the outlet 51A and an outlet 51B through paths indicated by arrows F2 and F3, respectively.

Furthermore, in the present embodiment, the two wall members 27A and 27B are disposed on the same plane (on the same level) below the heater 26 (on the first outlet 51A side) and symmetric with respect to the center of the supply tank 24. Therefore, the heated liquid is supplied from the center of the supply tank 24 to each of the outlets 51A and 51B. As a result, liquid heated to the same extent is supplied to liquid discharge heads 21A and 21B. Thus, it is possible to more reliably prevent the temperature of liquid from varying between the liquid discharge heads 21A and 21B. Note that the two wall members 27A and 27B need not be disposed on the same plane (on the same level), and may be disposed on slightly different levels. Also in the present embodiment, it is possible to avoid a change in the layout of parts such as connectors and propagation of liquid pressure fluctuation from one to the other of the liquid discharge heads. It is thus possible to provide a head module with a high liquid discharge accuracy without a significant design change.

Figure 8:
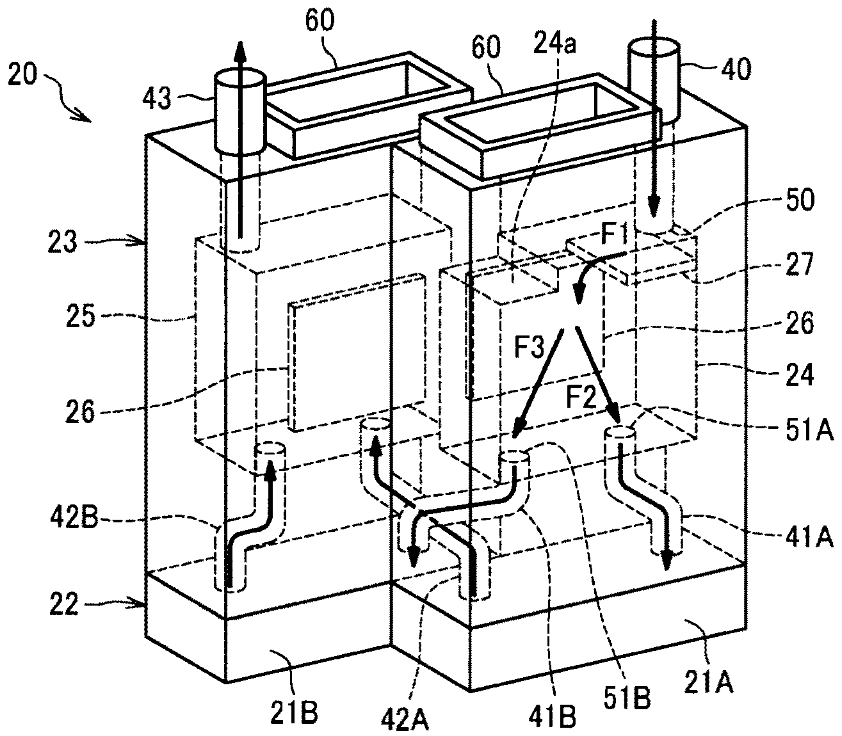
FIG. 8 is a diagram illustrating a configuration of a head module according to a fifth embodiment of the present disclosure.

FIG. 8 is a diagram illustrating a configuration of a head module 20 according to a fifth embodiment of the present disclosure.

In the fifth embodiment illustrated in FIG. 8, an upper surface of a supply tank 24 is partially recessed downward. Specifically, a recess 24*a* recessed downward (liquid introduction direction) is formed in the upper surface of the supply tank 24. The recess 24*a* and a wall member 27 are located on opposite sides of the center of the supply tank 24. As in the first embodiment (FIG. 4) described above, the wall member 27 in the present embodiment is provided between an inlet 50 and a first outlet 51A and located above a heater 26.

In this case, when liquid is introduced from the inlet 50, the liquid is guided by the wall member 27 in a direction of arrow F1 in FIG. 8, passes between the wall member 27 and the recess 24*a*, and is guided to a heating area for heating by the heater 26. Then, the liquid separately moves to the outlet 51A and an outlet 51B through paths indicated by arrows F2 and F3 in FIG. 8. That is, as with the second wall member 27B in the third embodiment (FIG. 6) described above, the recess 24*a* perform the function of regulating the flow of liquid and concentrating liquid in the center of the supply tank 24. Accordingly, also in the present embodiment, heating time to heat the liquid moving from the inlet 50 to the outlets 51A and 51B can be made substantially equal. It is thus possible to prevent the temperature of liquid to be supplied from varying between liquid discharge heads 21A and 21B. As with the second wall member 27B described above, a bottom surface (lower surface) of the recess 24*a* is preferably disposed on the same plane as the wall member 27 (first wall member 27A) disposed immediately below the inlet 50. However, the bottom surface of the recess 24*a* and the wall member 27 may be disposed on slightly different levels.

In the present embodiment, the upper surface of the supply tank 24 is recessed to form the recess 24*a*. Thus, the recess 24*a* is provided instead of the second wall member 27B provided in the third embodiment (FIG. 6) described above. As a result, it is possible to avoid accumulation of liquid in the upper portion of the supply tank 24. That is, in the third embodiment (FIG. 6) described above, since a space (gap) exists between the second wall member 27B and the upper inner surface of the supply tank 24, there is a possibility that liquid accumulates in this space. Meanwhile, in the present embodiment illustrated in FIG. 8, since there is no space above the recess 24*a*, liquid accumulation can be avoided. Therefore, in the present embodiment, it is possible to prevent thickening and adhesion of liquid due to accumulation of the liquid in the supply tank 24.

Also in the present embodiment, it is possible to avoid a change in the layout of parts such as connectors and propagation of liquid pressure fluctuation from one to the other of the liquid discharge heads, as in each of the above embodiments. It is thus possible to provide a head module with a high liquid discharge accuracy without a significant design change.

Figure 9:
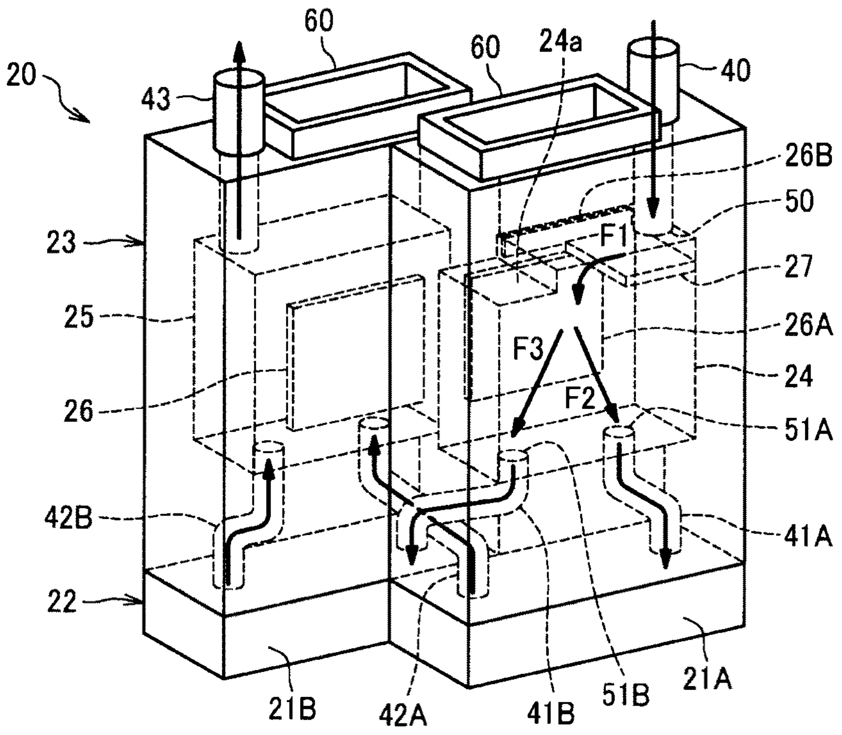
FIG. 9 is a diagram illustrating a configuration of a head module according to a sixth embodiment of the present disclosure.

FIG. 9 is a diagram illustrating a configuration of a head module 20 according to a sixth embodiment of the present disclosure.

Another heater 26B has been added above the wall member 27 (on the inlet 50 side) in the configuration of the fifth embodiment (FIG. 8) described above, to achieve the sixth embodiment illustrated in FIG. 9. That is, a main heater 26A and a sub-heater 26B are provided in the present embodiment. The main heater 26A serves as a first heating member that heats liquid below a wall member 27 (area between the wall member 27 and a first outlet 51A). The sub-heater 26B serves as a second heating member that heats liquid above the wall member 27 (area between an inlet 50 and the wall member 27).

As described above, since the sub-heater 26B is provided above the wall member 27, liquid being guided along an upper surface of the wall member 27 can also be heated. That is, in the configuration in which the wall member 27 is disposed above the main heater 26A as in the present embodiment, the effect of heating by the main heater 26A is less likely to reach liquid flowing above the wall member 27. However, it is possible to effectively heat liquid by providing the sub-heater 26B above the wall member 27. The main heater 26A and the sub-heater 26B need not be separated from each other, and may be integrated with each other. The supply tank 24 in which the sub-heater 26B described above is to be provided is not limited to the supply tank 24 having the recess 24*a* as illustrated in FIG. 9. Instead, the sub-heater 26B may be provided in the supply tank 24 (for example, the supply tank 24 illustrated in FIG. 4 or FIG. 6) not having the recess 24*a*.

Figure 10:
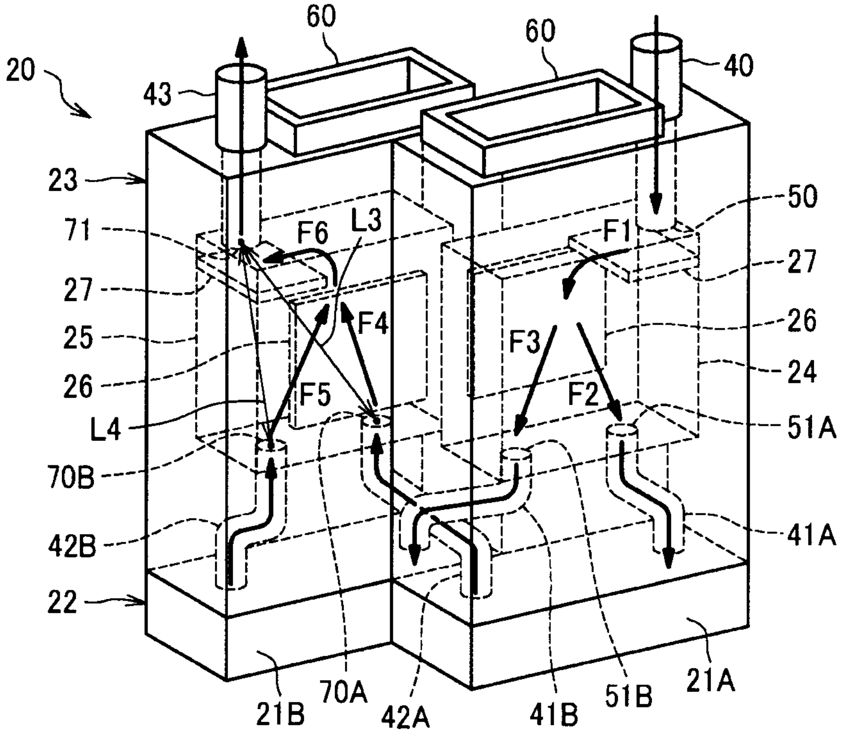
FIG. 10 is a diagram illustrating a configuration of a head module according to a seventh embodiment of the present disclosure.

FIG. 10 is a diagram illustrating a configuration of a head module 20 according to a seventh embodiment of the present disclosure.

In the seventh embodiment illustrated in FIG. 10, a wall member 27 is provided not only in a supply tank 24 but also in a recovery tank 25. Except for this point, the seventh embodiment and the first embodiment (FIG. 4) described above have basically the same configuration. The wall member 27 provided in the recovery tank 25 is disposed in the vicinity of a position immediately below an outlet 71 of the recovery tank 25, which is a point of connection between the recovery tank 25 and a common recovery passage 43.

Here, the recovery tank 25 has two inlets 70A and 70B, in addition to the single outlet 71. The outlet 71 is a point of connection between the recovery tank 25 and the common recovery passage 43. The inlets 70A and 70B are points of connection between the recovery tank 25 and individual recovery passages 42A and 42B, respectively. A distance L3 from the inlet 70A of the recovery tank 25 to the outlet 71 is different from a distance L4 from the inlet 70B of the recovery tank 25 to the outlet 71. The inlet 70A, that is, a first inlet 70A is located away from a position immediately below the outlet 71. The inlet 70B, that is, a second inlet 70B is located immediately below the outlet 71. Thus, the distance L3 between the first inlet 70A and the outlet 71 is longer than the distance L4 between the second inlet 70B and the outlet 71. Here, the distances L3 and L4 refer to distances from the inlets 70A and 70B to the outlet 71, respectively, in a state where the wall member 27 is not provided. The wall member 27 is interposed between the outlet 71 and the second inlet 70B at a shorter distance to the outlet 71.

Therefore, in the present embodiment, when liquid is introduced into the recovery tank 25 from the second inlet 70B, the liquid does not move linearly from the second inlet 70B toward the outlet 71, but moves by bypassing the wall member 27 as indicated by arrows F5 and F6 in FIG. 10. This makes it possible to reduce the difference between the length of a path of liquid from the second inlet 70B to the outlet 71 (the length of a path passing through F5 and F6) and the length of a path of liquid from the first inlet 70A to the outlet 71 (the length of a path passing through F4 and F6).

As described above, the wall member 27 is provided between the inlet and the outlet located at a shorter distance in the recovery tank 25, as in the supply tank 24. This makes it possible to use the recovery tank 25 as a supply tank. For example, even if liquid is introduced into the recovery tank 25 from the common recovery passage 43 in a direction opposite to a direction of circulation of the liquid illustrated in FIG. 10, the introduced liquid moves by bypassing the wall member 27. As a result, the liquid is heated for a longer time. Therefore, it is possible to prevent the temperature of liquid to be supplied from varying between liquid discharge heads 21A and 21B.

As described above, according to the configuration of the present embodiment, similar effect can be obtained even if the direction of circulation of the liquid is reversed. It is thus possible to change the direction of circulation of the liquid in the head module 20 according to device layout, design, or the like. As a result, versatility is improved.

The example of a circulation head module that supplies liquid recovered from liquid discharge heads to the liquid discharge heads again has been described in each of the above embodiments. However, the embodiments of the present disclosure can be applied not only to the circulation head module, but also to a non-circulation head module that does not recover liquid from liquid discharge heads.

Figure 11:
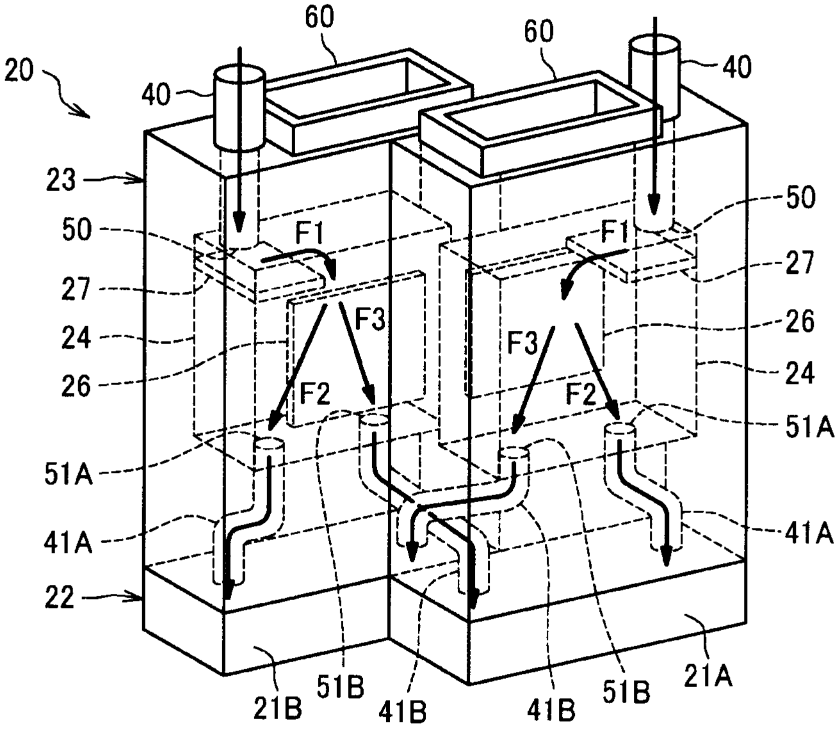
FIG. 11 is a diagram illustrating a non-circulation head module according to an embodiment of the present disclosure.

For example, a head module 20, which is a non-circulation head module, including two supply tanks 24 as illustrated in FIG. 11 may be adopted in an embodiment of the present disclosure. In the embodiment illustrated in FIG. 11, a heater 26 is provided for each of the supply tanks 24. In addition, a single common supply passage 40 and two individual supply passages 41A and 41B are coupled to each of the supply tanks 24. In each of the supply tanks 24, a wall member 27 that changes the direction of the flow of liquid is disposed in the vicinity of a position immediately below an inlet 50 which is a point of connection between the supply tank 24 and the common supply passage 40. That is, also in this example, the wall member 27 is interposed between the inlet 50 and a first outlet 51A at a shorter distance to the inlet 50, as in each of the above embodiments.

Therefore, when liquid is introduced into each supply tank 24, the liquid moves by bypassing the wall member 27 as indicated by arrows F1 and F2 in FIG. 11. As a result, it is possible to reduce the difference between lengths of paths of the liquid from the inlet 50 to the outlet 51A and an outlet 51B (the length of a path passing through F1 and F2 and the length of a path passing through F1 and F3) in each supply tank 24.

As described above, according to the embodiment of the present disclosure, it is possible to reduce the difference between lengths of paths of liquid from the inlet 50 of the supply tank 24 to the outlets 51A and 51B even in the head module 20 which is a non-circulation head module. Therefore, it is possible to reduce variation in the time during which the liquid is heated by the heater 26. This makes it possible to prevent the temperature of liquid to be supplied from varying between liquid discharge heads 21A and 21B. In addition, according to the embodiment of the present disclosure, it is possible to avoid a change in the layout of parts such as connectors and propagation of liquid pressure fluctuation from one to the other of the liquid discharge heads. It is thus possible to provide a non-circulation head module with a high liquid discharge accuracy without a significant design change.

Figure 12:
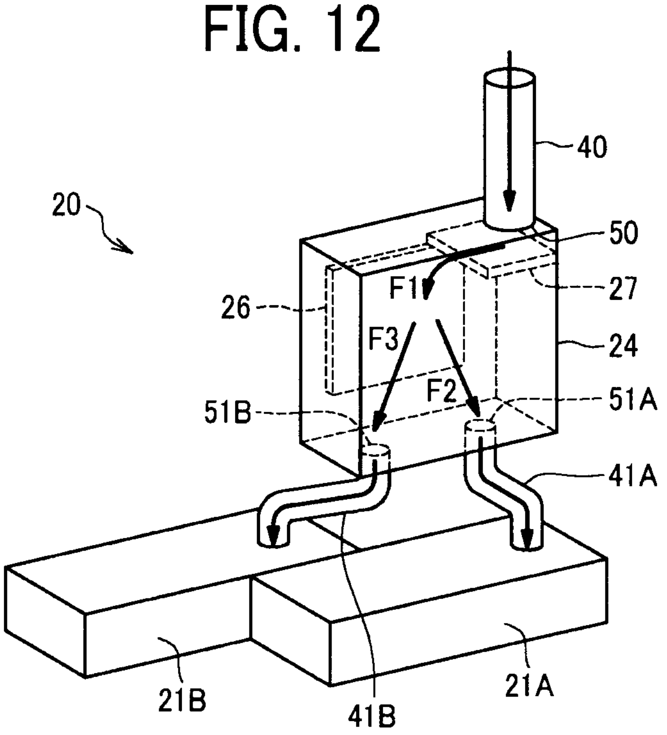
FIG. 12 is a diagram illustrating a non-circulation head module according to an embodiment of the present disclosure.

Furthermore, according to an embodiment of the present disclosure, it is possible to adopt a head module 20, which is a non-circulation head module, including a single supply tank 24 as illustrated in FIG. 12. Also in this case, a wall member 27 having the same function as described above is disposed in the supply tank 24. Thus, it is possible to prevent the temperature of liquid to be supplied from varying between liquid discharge heads 21A and 21B. Furthermore, also in this case, it is possible to avoid a change in the layout of parts such as connectors and propagation of liquid pressure fluctuation from one to the other of the liquid discharge heads.

As the configuration of the supply tank 24, the wall member 27, and the heater 26, the configuration of the first embodiment (FIG. 4) described above has been applied to the examples of non-circulation head modules illustrated in FIGS. 11 and 12. However, the configuration of each of the other embodiments illustrated in FIGS. 5 to 9 may be applied.

The embodiments of the present disclosure are applicable not only to a head module to be mounted on an inkjet image forming apparatus that is an example of a liquid discharge apparatus, but also to head modules to be mounted on other liquid discharge apparatuses.

In the present disclosure, the term "liquid discharge apparatus" refers to an apparatus that includes a liquid discharger and drives the liquid discharger to discharge liquid onto an object such as a sheet. The "liquid discharge apparatus" includes means related to the feeding, conveying, and discharging of an object, a pretreatment device, a post-treatment device, and the like.

The "liquid discharge apparatus" according to each embodiment of the present disclosure may be a liquid discharge apparatus including a liquid discharger that moves relative to a sheet, or may be a liquid discharge apparatus including a liquid discharger that does not move relative to a sheet. Specific examples of the "liquid discharge apparatus" include a serial type apparatus that moves a liquid discharge head (liquid discharger) and a line type apparatus that does not move a liquid discharge head (liquid discharger).

The "liquid discharge apparatus" is not limited to one that visualizes a meaningful image such as a character or a figure by means of discharged liquid. Examples of the "liquid discharge apparatus" include an apparatus that forms a pattern having no meaning in itself, an apparatus that forms a three-dimensional image, and a treatment liquid discharge apparatus that discharges treatment liquid onto a surface of a sheet for the purpose of modifying the surface of the sheet.

The above-described "sheet" refers to a sheet to which liquid can at least temporarily adhere, and includes a sheet to which liquid adheres, and a sheet into which liquid permeate after adhesion. Specific examples of the "sheet" include a recording medium such as paper, recording paper, a recording sheet, a film, and cloth, and an electronic substrate. The "sheet" is not limited to long continuous paper (roll paper) as described above, and may be a sheet (cut sheet) cut in a predetermined size in a sheet conveyance direction.

The material of the "sheet" may be paper, thread, fiber, fabric, leather, metal, plastic, glass, wood, ceramics, or the like, as long as liquid can adhere even temporarily.

The "liquid" to be discharged by the "liquid discharge apparatus" according to each embodiment of the present disclosure is not limited to a particular liquid as long as the liquid has a viscosity or surface tension sufficient to be discharged from the liquid discharger. However, the "liquid" preferably has a viscosity not greater than 30 mPa·s at ordinary temperature and ordinary pressure or by heating or cooling. More specifically, the "liquid" is a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), an amino acid, protein, or calcium, or an edible material, such as a natural colorant. The above-described examples can be used as, for example, inkjet inks, surface treatment liquids, liquids for forming constituent elements of electronic elements and light-emitting elements or resist patterns of electronic circuits, material liquids for three-dimensional fabrication, and edible inks.

<Electrode Manufacturing Apparatus>

The "liquid discharge apparatus" according to the present embodiment may also include an apparatus for manufacturing an electrode and an electrochemical element that is also referred to as "an electrode manufacturing apparatus". The electrode manufacturing apparatus is described below.

Figure 14:
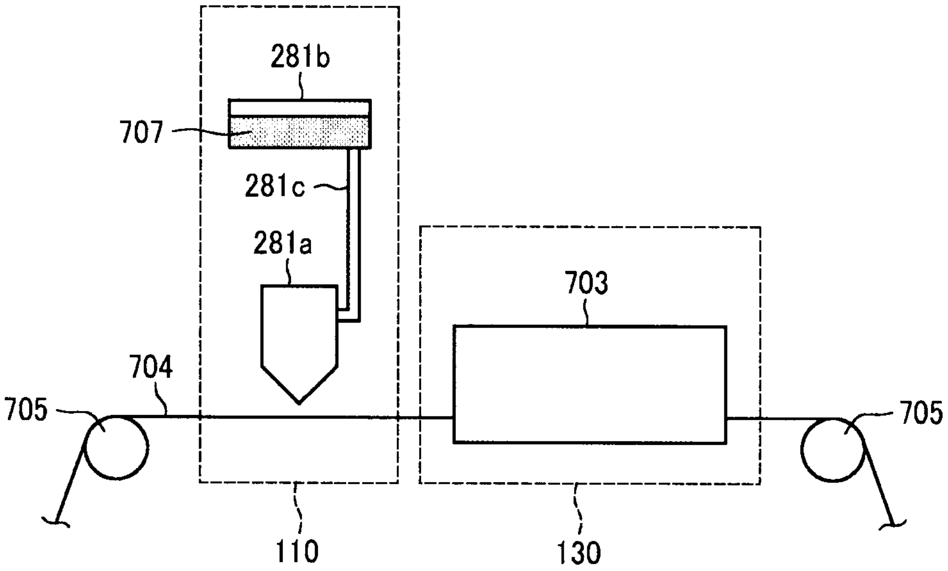
FIG. 14 is a diagram illustrating an electrode manufacturing apparatus according to an embodiment of the present embodiment.

FIG. 14 is a schematic view of an example of an electrode manufacturing apparatus according to an embodiment of the present embodiment. The electrode manufacturing apparatus is an apparatus for manufacturing an electrode including a layer containing an electrode material by discharging a liquid composition using a head module including a liquid discharge head.

<Unit for Forming Layer Containing Electrode Material and Process of Forming Layer Containing Electrode Material>

A discharge unit in the electrode manufacturing apparatus illustrated in FIG. 14 is the head module according to the embodiment of the present disclosure. The liquid composition is discharged from the discharge head of the head module, and thus the liquid composition is applied onto the target object, and a liquid composition layer is formed. The target (hereinafter, may be referred to as "discharge target") is not particularly limited and may be appropriately selected depending on the intended purpose, as long as the target is a target on which a layer containing an electrode material is to be formed. Examples of the target object include an electrode substrate (current collector), an active material layer, and a layer containing a solid electrode material. The target object may be an electrode mixture layer containing an active material on an electrode substrate (current collector). The discharging unit and the discharging process may be a unit and a process of forming a layer containing an electrode material by directly discharging a liquid composition as long as the layer containing an electrode material can be formed on a discharge target (target object). The discharging unit and the discharging process may be a unit and a process of forming a layer containing an electrode material by indirectly discharging a liquid composition.

<Other Configurations and Other Processes>

Other configurations included in the apparatus for manufacturing an electrode mixture layer are not particularly limited and may be appropriately selected depending on the intended purpose, as long as the effects of the present embodiment are not impaired. Other processes included in the method for producing an electrode mixture layer are not particularly limited and may be appropriately selected depending on the intended purpose, as long as the effects of the present embodiment are not impaired. For example, the heating unit and the heating process are examples of the configuration and the process included in the manufacturing apparatus and the manufacturing method of the electrode mixture layer.

<Heaters and Heating Processes>

The heating unit included in the apparatus for manufacturing an electrode mixture layer is a unit that heats the liquid composition discharged by the discharging unit. The heating process included in the method for manufacturing an electrode mixture layer is a process of heating the liquid composition discharged in the discharging process. The liquid composition is heated to dry the liquid composition layer.

<Structure to Form a Layer Containing Electrode Material by Direct Discharge of Liquid Composition>

As an example of the electrode manufacturing apparatus, an electrode manufacturing apparatus for forming an electrode mixture layer containing an active material on an electrode substrate (current collector) is described below. As illustrated in FIG. 14, the electrode manufacturing apparatus includes a discharge process unit 110 and a heating process unit 130. The discharge process unit 110 performs a step of applying a liquid composition onto a printing base material 704 having a discharge target object to form a liquid composition layer. The heating process unit 130 performs a heating process of heating the liquid composition layer to obtain an electrode mixture layer.

The electrode manufacturing apparatus includes a conveyor 705 that conveys the printing base material 704. The conveyor 705 conveys the printing base material 704 to the discharge process unit 110 and the heating process unit 130 in this order at a preset speed. A method for manufacturing the printing base material 704 having the discharge target such as an active material layer is not particularly limited, and a known method can be appropriately selected. The discharge process unit 110 includes a liquid discharge head 281*a* that performs an application process of applying the liquid composition onto the printing base material 704, a storage container 281*b* that stores the liquid composition 707, and a supply tube 281*c* that supplies the liquid composition 707 stored in the storage container 281*b* to the liquid discharge head 281*a*.

The discharge process unit 110 discharges the liquid composition 707 from the liquid discharge head 281*a* so that the liquid composition 707 is applied onto the printing base material 704 to form a liquid composition layer in a thin film shape. The storage container 281*b* may be formed together with the electrode manufacturing apparatus such as the apparatus for manufacturing the electrode mixture layer as a single body. The storage container 281*b* may be detachable from the electrode manufacturing apparatus such as the apparatus for manufacturing the electrode mixture layer. The storage container 281*b* may be a container formed together with the apparatus for manufacturing the electrode mixture layer. The storage container 281*b* may be a container additionally detachable from the apparatus for manufacturing the electrode mixture layer.

The storage container 281*b* and the supply tube 281*c* can be arbitrarily selected as long as the liquid composition 707 can be stably stored and supplied to the liquid discharge head 281*a*.

The heating process unit 130 performs a solvent removal process of heating and removing the solvent remaining in the liquid composition layer. Specifically, the solvent remaining in the liquid composition layer is heated and dried by the heating device 703 of the heating process unit 130, and thus the solvent is removed from the liquid composition layer. Thus, the electrode mixture layer is formed. The solvent removal process in the heating process unit 130 may be performed under reduced pressure.

The heating device 703 is not particularly limited and may be appropriately selected depending on the intended purpose. For example, the heating device 703 may be a substrate heater, an infrared (IR) heater, a hot air heater, or the like. The heating device 703 may be a combination of at least two of the substrate heater, the IR heater, and the hot air heater. A heating temperature and heating time can be appropriately selected according to a boiling point of the solvent contained in the liquid composition 707 or the thickness of a formed film.

The electrode manufacturing apparatus according to the embodiment of the present disclosure is used to discharge the liquid composition onto a desired target place of the discharge target. The electrode mixture layer can be suitably used as, for example, a part of the configuration of an electrochemical element. The configuration of the electrochemical element other than the electrode mixture layer is not particularly limited, and a known configuration can be appropriately selected. For example, as a configuration other than the electrode mixture layer, the electrochemical element may include a positive electrode, a negative electrode, a separator, for example. To summarize, the aspects of the present disclosure described above include a head module, an image forming apparatus, and a liquid discharge apparatus having at least the following configurations.

First Aspect

A head module includes: at least two liquid discharge heads to discharge liquid; a reservoir to store the liquid; a heating member to heat the liquid in the reservoir; an inlet from which the liquid is to be introduced into the reservoir; a first outlet from which the liquid in the reservoir is to be delivered to one of the liquid discharge heads; a second outlet from which the liquid in the reservoir is to be delivered to another of the liquid discharge heads, a distance between the inlet and the first outlet being shorter than a distance between the inlet and the second outlet; and a wall member interposed between the inlet and the first outlet.

Second Aspect

In the head module according to the first aspect, the wall member is disposed closer to the inlet than the heating member is.

Third Aspect

In the head module according to the first aspect, the wall member is disposed closer to the first outlet than the heating member is.

Fourth Aspect

In the head module according to any one of the first to third aspects, the wall member includes: a first wall member disposed between the inlet and the first outlet; and a second wall member disposed away from the first wall member, and the first wall member and the second wall member are disposed on opposite sides of a center of the reservoir as viewed from a liquid introduction direction.

Fifth Aspect

In the head module according to any one of the first to third aspects, the reservoir has a recess recessed in a liquid introduction direction, the recess and the wall member being located on opposite sides of a center of the reservoir as viewed from the liquid introduction direction.

Sixth Aspect

In the head module according to any one of the first to fifth aspects, the heating member includes: a first heating member to heat the liquid in an area between the wall member and the first outlet; and a second heating member to heat the liquid in an area between the inlet and the wall member.

Seventh Aspect

In the head module according to any one of the first to sixth aspects, the head module includes a circulation head module to supply the liquid recovered from the liquid discharge heads to the liquid discharge heads again.

Eighth Aspect

In the head module according to any one of the first to sixth aspects, the head module includes a non-circulation head module that does not recover the liquid from the liquid discharge heads.

Ninth Aspect

An image forming apparatus includes the head module according to any one of the first to eighth aspects.

Tenth Aspect

A liquid discharge apparatus includes the head module according to any one of the first to eighth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A head module, comprising:
at least two liquid discharge heads to discharge liquid;
a reservoir to store the liquid;
a heater to heat the liquid in the reservoir;
an inlet from which the liquid is to be introduced into the reservoir;
a first outlet from which the liquid in the reservoir is to be delivered to one of the liquid discharge heads;
a second outlet from which the liquid in the reservoir is to be delivered to another of the liquid discharge heads, a distance between the inlet and the first outlet being shorter than a distance between the inlet and the second outlet; and
a wall interposed between the inlet and the first outlet,
wherein the wall is a diverter to make a temperature of the liquid exiting the first outlet closer to a temperature of the liquid heated by the heater exiting the second outlet.

2. The head module according to claim 1, wherein:
the wall is disposed closer to the inlet than the heater is.

3. The head module according to claim 1, wherein:
the wall is disposed closer to the first outlet than the heater is.

4. The head module according to claim 1, wherein:
the wall includes:
a first wall disposed between the inlet and the first outlet; and
a second wall disposed away from the first wall, and the first wall and the second wall are disposed on opposite sides of a center of the reservoir as viewed from a liquid introduction direction.

5. The head module according to claim 1, wherein:

the reservoir has a recess recessed in a liquid introduction direction, the recess and the wall being located on opposite sides of a center of the reservoir as viewed from the liquid introduction direction.

6. The head module according to claim 1, wherein the heater includes:

a first heater to heat the liquid in an area between the wall and the first outlet; and a second heater to heat the liquid in an area between the inlet and the wall.

7. The head module according to claim 1, wherein:

the head module is a circulation head module to supply the liquid recovered from the liquid discharge heads to the liquid discharge heads again.

8. The head module according to claim 1, wherein:

the head module is a non-circulation head module not to recover the liquid from the liquid discharge heads.

9. An image forming apparatus, comprising:

the head module according to claim 1.

10. A liquid discharge apparatus, comprising:

the head module according to claim 1.

11. The head module according to claim 1, wherein:

the wall lengthens a moving distance of the liquid from the inlet to the first outlet such that a difference between a length of a path of the liquid from the inlet to the first outlet and a length of a path of the liquid from the inlet to the second outlet is reduced.

12. The head module according to claim 11, wherein:

the wall makes a time that the liquid heated by the heater which exits from the first outlet closer to a time that the liquid which is heated by the heater which is exits from the second outlet than if the wall did not exist so that the temperature of the liquid exiting the first outlet is closer to the temperature of the liquid exiting the second outlet.

13. The head module according to claim 1, wherein:

the wall makes a time that the liquid heated by the heater which exits from the first outlet closer to a time that the liquid which is heated by the heater which is exits from the second outlet than if the wall did not exist so that the temperature of the liquid exiting the first outlet is closer to the temperature of the liquid exiting the second outlet.

* * * * *